Patented July 25, 1933

1,920,100

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

SYNTHETIC RESIN AND METHOD OF MAKING THE SAME

No Drawing. Application filed October 21, 1927. Serial No. 227,871.

This invention relates to the preparation of a resin by condensing a ketone-phenol resin with an aldehyde.

An object of my invention is to produce a synthetic resin of the acetone-phenol type which is of general use but which is particularly useful as an ingredient in varnishes and lacquers because of its water resistant properties.

A further object of my invention is to produce a synthetic resin from a ketone-phenol resin by further condensing the same with an aldehyde. Other objects of my invention will appear from the following detailed description.

Generally when a synthetic resin that is obtained by the condensation of certain organic substances with phenol is heated with approximately another molecular proportion of an aldehyde, such as formaldehyde, a resin of the reactive type is produced which is rapidly converted by subsequent heating to an infusible and insoluble resin.

I have found that if a ketone-phenol resin such as acetone-phenol-resin (diphenylol-propane-acetone resin) is heated with formaldehyde in the presence of an acid as catalyst, a condensation takes place to form a new resin having different properties from the first. The acetone-phenol resin may be produced by condensing acetone-phenol (diphenylol propane) with acetone in the presence of an acid catalyst as is described in U. S. Patent No. 1,878,249 granted on my copending application No. 227,870 filed October 21, 1927. Throughout this specification the term "diphenylol propane" is used to denote the product obtained by the condensation of two molecules of phenol with one molecule of acetone and having the empirical formula $C_{15}H_{16}O_2$ and the probable constitutional formula:

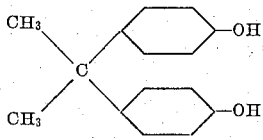

The proportion of formaldehyde that is used may be varied, but I have found it preferable to use one gram molecule of formaldehyde for each gram molecule of acetone-phenol (diphenylol propane) that was used in the preparation of the acetone-phenol resin (diphenylol-propane-acetone resin) that is used as the starting material. The acetone-phenol-acetone resin and formaldehyde are heated under reflux together with 0.1 to 5% of a molecular proportion of an acid, such as hydrochloric acid or phosphoric acid. The resin melts beneath the formaldehyle but does not completely dissolve therein. After some hours of heating, a test of the clear liquid shows that the film has substantially combined with the resin yielding a resin which usually appears lighter than that originally used. The time required varies with the temperature employed and the amount and nature of the catalyst used.

The resulting product is washed with water, and then distilled with or without steam either at ordinary pressure or under vacuum until any desired freedom from uncombined reactants of catalyst is obtained. The resulting new resin is of a clear, brown or dark red color and melts at about 100° C. The resin is of the soluble, fusible and non-reactive type. It is soluble in alcohol, acetone and benzene and in all the usual solvents used for making cellulose ester lacquers. When used as an ingredient of cellulose ester lacquers having cellulose acetate or cellulose propionate as the main constituent of the base, the resin is compatible with the cellulose esters both in solution and in the dried film thus yielding clear, homogeneous, hard films of good gloss. The films thus produced adhere well to metallic, wood or other smooth hard surfaces and possess a high degree of water resistance.

In order to further explain my invention, a specific example of one mode of carrying out the same is here given. The following ingredients

| | Kg. |
|---|---|
| Acetone-phenol-acetone resin (diphenylol-propane-acetone resin) | 26.8 |
| Formaldehyde (40% strength) | 7.5 |
| Phosphoric acid | 0.26 | are heated under reflux until substantially all the formaldehyde has combined to form the new resin. The resin is washed with about 10 kg. of water and then with about 10 kg. of water containing about 1 kg. of sodium carbonate or an equivalent amount of other alkaline material. The resin is then steam distilled or vacuum distilled for about 3 hours, and then further distilled at ordinary pressure until the sample on cooling is clear and solidifies at about 100° C.

The new resin is of general application and may be used for all purposes for which synthetic resins of this type are employed in the plastic art. It is very useful as an ingredient in lacquers containing derivatives of cellulose such as cellulose nitrate or organic derivatives of cellulose. Examples of organic derivatives of cellulose are cellulose esters such as cellulose formate, cellulose acetate, cellulose propionate, cellulose butyrate and cellulose ethers such as methyl cellulose, ethyl cellulose and benzyl cellulose.

As an illustration of the use of the resin in lacquers the following formula of a lacquer is given.

| | Kg. |
|---|---|
| Cellulose acetate | 5 |
| Synthetic resin | 5 |
| Softener (such as triacetin) | 1 |
| Acetone | 80 |
| Ethyl lactate | 20 |

Obviously other softeners such as diethyl phthalate may be used instead of the triacetin, and other high boilers may be used instead of ethyl lactate.

It is to be understood that the foregoing detailed description is given merely by way of illustration and that many variations may be made therein without departing from the spirit of the invention.

Having described my invention what I claim and desire to secure by Letters Patent is:

1. Process of producing a synthetic resin comprising reacting a crystallizable condensation product of a ketone and phenol with a ketone in the presence of a condensation-promoting catalyst until condensation takes place and then reacting the resulting resin with an aldehyde in the presence of a condensation promoting catalyst.

2. Process of producing a synthetic resin comprising reacting a crystallizable condensation product of acetone and phenol with acetone in the presence of a condensation-promoting catalyst until condensation takes place and then reacting the resulting resin with an aldehyde in the presence of a condensation promoting catalyst.

3. Process of producing a synthetic resin comprising reacting a crystallizable condensation product of acetone and phenol with acetone in the presence of an acid catalyst until condensation takes place and then reacting the resulting resin with formaldehyde in the presence of a condensation promoting catalyst.

4. A diphenylolpropane-ketone aldehyde resin substantially identical with that obtained by the condensation of a diphenylolpropane-ketone resin with an aldehyde.

5. A diphenylolpropane-acetone aldehyde resin substantially identical with that obtained by the condensation of a diphenylolpropane-acetone resin with an aldehyde.

6. A diphenylolpropane-ketone formaldehyde resin substantially identical with that obtained by the condensation of a diphenylolpropane-ketone resin with formaldehyde.

7. A diphenylolpropane-acetone formaldehyde resin substantially identical with that obtained by the condensation of a diphenylolpropane-acetone resin with formaldehyde.

WILLIAM H. MOSS.